United States Patent [19]

Tamhankar et al.

[11] Patent Number: 4,713,224

[45] Date of Patent: Dec. 15, 1987

[54] ONE-STEP PROCESS FOR PURIFYING AN INERT GAS

[75] Inventors: Satish Tamhankar, Scotch Plains; William R. Weltmer, Murray Hill, both of N.J.

[73] Assignee: The BOC Group, Inc., Montvale, N.J.

[21] Appl. No.: 846,184

[22] Filed: Mar. 31, 1986

[51] Int. Cl.$^4$ .................. C01B 13/00; C01B 1/26; C01B 17/16; B01J 8/00

[52] U.S. Cl. .................. 423/219; 423/230; 423/247; 423/248

[58] Field of Search .............. 423/247, 248, 219, 230

[56] References Cited

U.S. PATENT DOCUMENTS 4,082,834 4/1978 Grossman et al. ............ 423/247
4,579,723 4/1986 Weltmer et al. ............. 423/248

OTHER PUBLICATIONS

Bailar et al., Chemistry, 1978, p. 421.

*Primary Examiner*—Gregory A. Heller
*Assistant Examiner*—Lori S. Freeman
*Attorney, Agent, or Firm*—Chris P. Konkol; Larry R. Cassett

[57] ABSTRACT

There is disclosed a one-step process for purifying an inert gas achieved by contacting the inert gas including minute quantities of an impurity selected from the group consisting of CO, $CO_2$, $O_2$, $H_2$, $H_2O$ and mixtures thereof with a particulate material comprised of nickel in an amount of at least about 5% by weight as elemental nickel distributed over an effective area of surface, typically from about 100 to 200 $m^2/g$, thereby forming an inert gas having less than 1 ppm and preferably less than 0.1 ppm of any such impurity.

19 Claims, No Drawings

ONE-STEP PROCESS FOR PURIFYING AN INERT GAS

BACKGROUND OF THE INVENTION (1) Field of the Invention

This invention relates to a process for purifying a gaseous stream, and more particularly to a one-step process for removing parts per million levels of impurities from an inert gaseous stream.

(2) Description of the Prior Art

As the semiconductor industry is developing integrated circuits with ever increasing line densities, the manufacturing processes employed require that materials utilized are as free of impurities as is possible. Inert gas, such as nitrogen or argon, is frequently utilized in semiconductor manufacturing processes and while commercially available nitrogen and argon are relatively pure, it is necessary to assure that purities are maintained so as to avoid contamination of semiconductor materials by impurities, such as $H_2$, $H_2O$, $CO$, $CO_2$, $O_2$, and the like.

Although nitrogen will react with certain elements under particular conditions, it will be understood that the term "inert gas" as used herein includes nitrogen. It has previously been proposed to remove certain of the above mentioned impurities, e.g., $O_2$ by catalytically combining oxygen with hydrogen over a catalyst, such as DeOxo D; however, such process requires relatively high temperatures (e.g. 450° C.) to assure catalytic combustion of the $O_2$ to the extent necessary to form $H_2O$. Therefore, it is then necessary to cool the hot "purified" inert gas in a heat exchanger or like equipment prior to process usage, thereby adding a step to the overall purification process. A typical catalytic process for reacting hydrogen with oxygen is disclosed in Japanese published Patent Application No. 59-54608.

It is known to use zeolites to adsorb oxygen in inert gas streams, and typically such processes involve coling a zeolite bed to a very low temperature, e.g. below about $-220°$ F. Low temperatures or cryogenic conditions, in turn, require special equipment, materials, insulation, and the like. A typical adsorption process of this type is disclosed in U.S. Pat. No. 3,928,004. It is also known to utilize zeolites to remove $CO_2$ from air or inert gas streams at ambient temperatures. Such a method is disclosed in U.S. Pat. No. 3,885,927. While it would appear from this reference that carbon dioxide may be removed from air or inert gas streams, it does not appear that the adsorbents, as disclosed therein, are effective to remove other impurities, such as $O_2$, $H_2$, or $CO$, nor is such capability suggested in such reference.

Other techniques for removing oxygen from gaseous streams include the use of copper-based getter materials, such as described in Japanese Patent Application No. 53-33312 wherein the getter material is heated to a temperature of at least 150° C., and cooled prior to use. Such process is only effective to remove oxygen and not impurities, such as $H_2O$ and $CO_2$. The use of nickel-based materials to remove oxygen only is disclosed in U.S. Pat. No. 3,682,585 and in Japanese Patent No. Sho 50(1975)-6440.

In co-pending U.S. application Ser. No. 717,055, filed Mar. 28, 1985, now U.S. Pat. No. 4,579,723 there is disclosed a two-step process for removing parts per million level of gaseous impurities, i.e. carbon monoxide, carbon dioxide, hydrogen, water vapor and oxygen from an inert gas stream, such as nitrogen or argon, at substantially ambient temperatures. In a first step of the process, the gas stream is passed through a bed of catalytic material, such as platinum-rhodium on an alumina substrate, wherein carbon monoxide and hydrogen react with oxygen to form carbon dioxide and water with water being at least partially adsorbed in the catalyst. In a second stage of the process, the thus treated gaseous stream is passed through a bed of a getter material, such as copper on an alumina substrate, wherein oxygen reacts therewith and carbon dioxide and $H_2O$ are trapped therein to produce an inert gas stream substantially free of gaseous impurities, generally less than about 1.0 part per million of such impurities. Such a two-stage process requires an elaborate piping and valving system as well as intricate fluid flow configuration to effect regeneration of the respective catalytic and getter beds.

OBJECTS OF THE INVENTION

An object of the present invention is to provide an improved process for removing minute quantities of gaseous impurities from an inert gas stream.

Another object of the present invention is to provide an improved process for removing minute quantities of gaseous impurities from an inert gas stream in a single stage.

Still another object of the present invention is to provide an improved process for removing minute quantities of gaseous impurities from an inert gas stream at ambient temperatures in a single bed of particulate material.

A further object of the present invention is to provide an improved process for removing minute quantities of gaseous impurities from an inert gas stream at substantially ambient temperatures.

A still further object of the present invention is to provide an improved process for removing minute quantities of gaseous impurities from an inert gas stream using an inexpensive particulate material.

A further object of the present invention is to provide an improved process for removing minute quantities of gaseous impurities from an inert gas stream using a particulate material capable of facile regeneration techniques.

Yet another object of the present invention is to provide an improved process for removing minute quantities of gaseous impurities from an inert gas stream, in which the removal of one impurity is not dependent on the presence of another impurity.

SUMMARY OF THE INVENTION

These and other objects of the present invention are achieved by contacting the inert gas, including minute quantities of an impurity selected from the group consisting of $CO$, $CO_2$, $O_2$, $H_2$, $H_2O$ and mixtures thereof with a particulate material comprised of nickel in an amount of at least about 5% by weight as elemental nickel ($Ni^0$) and having a large surface area, e.g. from about 100 to 200 $m^2/g$, thereby to form an inert gas having less than several ppmv's of any such impurity, preferably less than 1 ppmv, and most preferably less than 0.1 ppmv.

DETAILED DESCRIPTION OF THE INVENTION

In accordance with the present invention, an inert gas stream, typically nitrogen or argon, which contains parts per million levels of impurities is further purified to produce an inert gas essentially free of any such impurities. A typical inert gas stream is available from conventional cryogenic air separation units wherein purities are readily obtainable of at least 99.999 percent. In this context, any argon or helium present in a nitrogen stream is not considered an impurity. Usually, the impurities in such inert gas streams include oxygen, hydrogen, and carbon monoxide, which for many applications or uses of such inert gas streams, will not present significant problems. However, as previously mentioned, in order to fabricate semiconductor materials, inert gas streams must be purified to higher levels than are conventionally available from air separation units. To facilitate an understanding of the present invention, the present invention is described in the context of treating an inert gas stream comprised of nitrogen.

While a typical "merchant" inert gas stream, formed by vaporizing liquid nitrogen or liquid argon, frequently contains the aforementioned impurities, such a gaseous stream may also contain parts per million levels of $CO_2$ and $H_2O$. The latter impurities are typically picked up by the inert gas stream during the handling and delivery thereof between the air separation plant and the end use location. Generally, a total level of all of such foregoing impurities amounts to less than about 10 ppmv, although the process of the present invention may treat inert gas streams having higher levels of impurities of up to as high as 1000 ppmv.

The inert gas to be purified is passed to a vessel including an inlet conduit and an outlet conduit and having a suitable internal support assembly for a bed of particulate material. The particulate material in accordance with the present invention is comprised of nickel in an amount of at least about 5% by weight nickel as elemental nickel ($Ni^o$) with an inert material, such as alumina and/or silica, and may be supported, for example, on a silica-based substrate. The nickel, as elemental nickel, has a surface area of at least about 100 $m^2$/g., and typically a surface area of from 100 to 200 $m^2$/g. The particulate material is generally in the shape of pellets having a diameter of from $\frac{1}{8}$ to $\frac{1}{4}$ inches and a length of from $\frac{1}{8}$ to $\frac{1}{4}$ inches.

The particulate material of the present invention may be purchased from any catalyst manufacturer, e.g. a catalyst is available from Nikki Chemical Company comprised of about 46-47 weight percent nickel (as NiO). Generally, nickel-based materials are available in unreduced from, i.e. NiO, or in a reduced and stabilized form, i.e. significant amounts of $Ni^o$ (5-10%), which, however, is inactivated by adsorbed $CO_2$. In the former form, the nickel-based material must be pretreated to reduce NiO to elemental nickel prior to processing an inert gas stream to be purified in accordance with the present invention, whereas in the latter form, the nickel-based material is preferably pretreated prior to processing the inert gas stream.

To pretreat an unreduced nickel-based particulate material, the material is contacted with an inert gaseous stream containing hydrogen, such as a purified nitrogen gas stream including up to about 5% hydrogen, such as used in the regeneration process, as more fully hereinafter discussed. The nickel oxide is thereby reduced to $Ni^o$ so as to achieve the presence of at least about 5% by weight nickel as elemental nickel in the particulate material prior to processing the inert gas stream. In the reduced and stabilized form of the particulate material, the nickel-based particulate material may contain at least about 5% by weight nickel as elemental nickel and may be used in the process of the present invention for a nominal period of time. However, such reduced and stabilized form is preferably treated with an inert gas stream, such as nitrogen, and generally with added hydrogen, as hereinabove discussed, prior to usage in the process of the present invention.

The bed of particulate material is disposed in the vessel to a predetermined depth and the inert gas to be treated, generally at ambient temperature (e.g. from 0° to 50° C.), is introduced through the inlet conduit into the vessel. During passage through the bed of particulate material, carbon monoxide and/or hydrogen, if any is contained in the nitrogen, may react with oxygen at the temperature level therein to form carbon dioxide and/or water vapor. Simultaneously during passage of the inert gas through the bed of particulate material in the contact vessel, carbon dioxide and water vapor either contained in the incoming inert gas or formed during passage of the inert gas through the bed of particulate material are trapped or adsorbed in the bed of particulate material, whereas unreacted oxygen is reacted with or adsorbed in the particulate material. Even if no oxygen is present in the inert gas or the amount of oxygen in the inert gas being treated is stoichiometrically less than necessary to convert hydrogen and carbon monoxide to water and carbon dioxide, respectively, hydrogen and carbon monoxide present in the inert gas being treated is nevertheless adsorbed in the particulate material.

The particulate material of the present invention is not narrowly designated in functional terms solely as either a catalytic or getter material. The present invention utilizes a nickel containing material to effect removal of the aforementioned impurities. While nickel-based materials have been known to remove oxygen from a gaseous stream, i.e. acting as a getter, it was surprising to find that a nickel-based material wherein nickel is present in an amount of at least about 5% by weight as elemental nickel could effect catalysis as well as exhibit chemisorption activity to remove minute quantities of carbon monoxide, carbon dioxide, hydrogen and water vapor in inert gas streams at ambient temperature levels. Additionally, it was surprising to find that the presence of oxygen, let alone a stoichiometric excess of oxygen based on carbon monoxide and hydrogen present in the inert gas, is not required to effect removal of the relevant impurities to the resulting levels.

Processing of the inert gas through the bed of particulate material to remove such impurities may be in continuous or batch-wise operation over extended periods of time while achieving in the product stream a desired maximum level of impurities of less than 1.0 ppmv, and preferably less than 0.1 ppmv. Generally, the on-line time for passing the inert gas to be purified through the bed is a function of the amount of impurities in the gas, and may be quantified to total mass flow of the inert gas as determined by instrumentation to measure a level of a certain gas impurity component, e.g. carbon dioxide in the product gas. It will be understood by one skilled in the art that the level of impurities will determine on-line production times as well as frequency of regeneration.

Flow of the inert gas stream being treated through the bed of particulate material may be continued to a point in time wherein one or more of the impurities in the inert gas stream being treated appear in the product gas stream exiting the vessel. Generally, prior to such point in time, it is desirable to regenerate the bed of particulate material preferably as hereinafter described.

At a predetermined time, the supply of inert gas stream being treated to the inlet of the vessel is terminated and regeneration of the particulate material initiated. Generally, regeneration of the bed of particulate material includes the passage of gaseous streams in a direction countercurrent to the flow of feed inert gas stream being treated.

The regeneration of the bed of particulate material includes an initial flow of inert purge gas, e.g. nitrogen at ambient temperature, followed by a flow of such inert gas heated to a temperature of from 180° to 200° C. Thereafter, hydrogen in an amount up to 20 volume percent, typically of from 2 to 5 volume percent, is added to the hot inert purge gas and the flow thereof continued for a time period of from 6 to 8 hours. After such time period, hydrogen addition is discontinued and the flow of hot inert purge gas heated to a temperature of about 200° C. is continued for a time period of from 8 to 12 hours. The bed of particulate material is then cooled to ambient temperatures in a continuing flow of inert purge gas, after which time the vessel may be returned to duty for the treatment of an inert gas stream.

The flow rate of the purge gas is typically about 5 to 20%, preferably about 10 percent of the flow rate of the inert gas stream being treated. Thus, a relatively small flow of purge gas is required to regenerate the bed of particulate material. The inert purge gas flow is heated to assist in eluting moisture and carbon dioxide from the bed of particulate material. The pure inert gas stream withdrawn from the vessel during regeneration is normally vented to atmosphere, but may be utilized for other purposes if the impurities therein can be tolerated in another process.

Usually, regeneration is effected at about atmospheric pressure. Care should be taken to avoid a temperature level of the bed of particulate material in excess of about 250° C. during regeneration. Generally, the total period of time required for regeneration is approximately 10 to 20% of the "on-line" time of the process according to the present invention. Such regeneration processing techniques may be effectively repeatedly used over extended periods of time without deleterious effects to the bed of particulate material.

EXAMPLES OF THE INVENTION

The following examples are illustrative of conditions for the process of the present invention and it is to be understood that the scope of the present invention is not to be limited thereby.

EXAMPLE I

A vessel having a bed volume of 230 cm$^3$ is filled with about 300 g. of particulate material comprised of 51.63% nickel (as NiO) on a silica-based substrate of cylindrically-shaped pellets having a dimension of $\frac{1}{8} \times \frac{1}{8}$". The particulate material is pretreated to the extent necessary to provide at least 5% weight nickel as elemental nickel. An inert gas comprised of nitrogen to be purified contains the following impurities:

| Component | ppm |
| --- | --- |
| Oxygen | 16 |
| Hydrogen | 2.7 |

| Component | ppm |
| --- | --- |
| Carbon Monoxide | 2.7 |

The inert gas is introduced at a temperature of 20° C. and continuously passed through the bed of particulate material at a flow of 15 slpm for a period of 8 days, while removing such impurities to a level of less than 0.1 ppmv.

After such period, the flow of inert gas was discontinued and regeneration of the bed of particulate material is effected, including the introduction of a gaseous mixture of nitrogen-hydrogen (2 to 3 volume % H$_2$) at a temperature of 180° to 200° C. in countercurrent flow relationship at a space velocity of about 700 vol/vol:hr for a period of 6 hours followed by nitrogen purge at a space velocity of 700 vol/vol:hr for a period of 8 hours to complete regeneration. The flow of inert gas to be treated to the bed of particulate material may be resumed with like effectiveness in the reduction of impurities to below 0.1 ppmv.

EXAMPLE II

To the vessel used in Example I filled with like particulate material, there is introduced nitrogen to be purified including 25 ppmv oxygen at a temperature of 20° C. The gas is continuously passed through the bed of particulate material at a flow rate of 15 slpm for a period of 5 days during which period the level of oxygen in the product gas is maintained at less than 0.1 ppmv. Thereafter, the bed of particulate material is regenerated as hereinabove discussed, including the steps of passing a gaseous mixture of nitrogen-hydrogen (2 to 3 volume % H$_2$) at a temperature of 180° to 200° C. in countercurrent flow relationship at a space velocity of about 700 vol/vol:hr for a period of 6 hours followed by nitrogen purge at a space velocity of 700 vol/vol:hr for a period of 8 hours.

EXAMPLE III

To the vessel used in Example I filled with like particulate material and as regenerated in accordance therewith, there is introduced an inert gas comprised of nitrogen and 2 ppmv of CO at a temperature of 20° C. The gas is continuously passed through the bed of particulate material at a flow of 15 slpm for a period of 5 days during which period of time no carbon monoxide is detected in the product gas stream.

EXAMPLE IV

To the vessel used in Example I filled with like particulate material and as regenerated as set forth therein, there is introduced an inert gas comprised of nitrogen and only 2 ppmv of hydrogen at a temperature of 20° C. The gas is continuously passed through the bed of particulate material at a flow of 15 slpm for a period of 20 days during which period of time, no hydrogen (i.e. less than 0.01 ppmv) is detected in the inert gas stream withdrawn from the vessel.

EXAMPLE V

To the vessel used in Example I filled with like particulate material and as regenerated as set forth therein, there is introduced an inert gas comprised of nitrogen and the following impurities:

| Component | ppm |
|---|---|
| Oxygen | 16 |
| Hydrogen | 2.7 |
| Carbon Monoxide | 2.7 |

The inert gas is introduced at a temperature of 50° C. and continuously passed through the bed of particulate material at a flow of 15 slpm for a period of 5 days during which period no impurities appeared in the product, i.e. less than 0.1 ppmv.

It will be readily apparent from the above examples that the process of the present invention is effective in the removal of the enumerated impurities whether individually present or in diverse combinations, whether at low levels of impurity or at high levels of impurity in the inert gas stream to be purified, as well as at a range of substantially ambient temperatures.

While the present invention has been described in connection with exemplary embodiments thereof, it will be understood that many modifications will be apparent to those of ordinary skill in the art, and that this application is intended to cover any adaptations or variations thereof. Therefore, it is manifestly intended that this invention be only limited by the claims and the equivalents thereof.

What is claimed is:

1. A novel single-stage process for purifying an inert gas feed stream containing not greater than 1000 ppmv of impurities selected from the group consisting of carbon monoxide, carbon dioxide, oxygen, hydrogen, water vapor and mixtures thereof, consisting essentially of passing said inert gas stream comprising at least carbon monoxide, carbon dioxide and oxygen through a bed of particulate material comprised of nickel in an amount of at least about 5% by weight as elemental nickel at a temperature of from 0° to 50° C. and withdrawing a purified inert gas containing less than about several parts per million of said impurity.

2. The novel process as defined in claim 1 wherein said purified inert gas contains less than 1 ppmv.

3. The novel process as defined in claim 1 wherein said purified inert gas contains less than 0.1 ppmv.

4. The novel process as defined in claim 1 wherein said particulate material has a surface area of at least about 100 m²/g.

5. The novel process as defined in claim 1 wherein said particulate material has a surface area of from 100 to 200 m²/g.

6. The novel process as defined in claim 1 wherein said inert gas is nitrogen.

7. The novel process as defined in claim 1 wherein said inert gas is argon.

8. The novel process as defined in claim 1 wherein the purified inert gas is monitored for an impurity level of less than 1 ppm.

9. The novel process as defined in claim 8 wherein the flow of said inert gas stream through said bed of particulate material is discontinued upon reaching a unacceptably high impurity level and thereafter an inert purge gas stream is passed through said bed of particulate material for a period of time necessary to desorb impurities from said particulate material.

10. The novel process as defined in claim 9 wherein said inert purge gas stream is at a temperature of from about 180° to 200° C.

11. The novel process as defined in claim 10 wherein said inert purge gas stream includes hydrogen.

12. The novel process as defined in claim 11 wherein said inert purge gas stream is nitrogen.

13. The novel process as defined in claim 1 wherein said bed of particulate material is formed by contacting a bed of particulate material comprised of unreduced nickel with an inert gas stream including hydrogen for a period of time necessary to form said bed of particulate material including at least 5% by weight nickel as elemental nickel.

14. The novel process as defined in claim 13 wherein said inert gas stream is at a temperature of 180° to 200° C.

15. The novel process as defined in claim 14 wherein the thus treated bed of particulate material is cooled by passing an untreated inert gas stream therethrough for a period of time necessary to permit said bed of particulate material to reach ambient temperature.

16. The novel process as defined in claim 1 wherein said bed of particulate material is formed by contacting a bed of particulate material comprised of reduced and stabilized nickel with an inert gas stream including hydrogen for a period of time to form said bed of particulate material including at least 5% by weight nickel as elemental nickel.

17. The novel process as defined in claim 16 wherein said inert gas stream is at a temperature of 180° C. to 200° C.

18. The novel process as defined in claim 17 wherein the thus treated bed of particulate material is cooled by passing an untreated inert gas stream therethrough for a time to permit said bed of particulate material to reach ambient temperature.

19. The novel process as defined in claim 1 wherein said inert gas feed stream contains not greater than 10 ppmv of impurities.

* * * * *